United States Patent [19]
Hocking

[11] Patent Number: 4,977,926
[45] Date of Patent: Dec. 18, 1990

[54] CHECK VALVE

[75] Inventor: Gary A. Hocking, Doncaster, Australia

[73] Assignee: Stockham Valve Australia Pty. Ltd., Thomastown, Australia

[21] Appl. No.: 409,673

[22] Filed: Sep. 20, 1989

[30] Foreign Application Priority Data

Sep. 21, 1988 [AU] Australia ............................ PJ0560
Sep. 21, 1988 [AU] Australia ............................ PJ0561

[51] Int. Cl.⁵ ............................................. F16K 15/03
[52] U.S. Cl. .................................. 137/512.1; 137/527
[58] Field of Search ............................. 137/512.1, 527

[56] References Cited

U.S. PATENT DOCUMENTS

| 3,023,771 | 3/1962 | Hinds | 137/512.1 X |
| 3,074,427 | 1/1963 | Wheeler, Jr. | 137/512.1 |
| 3,678,958 | 7/1972 | Satterwhite et al. | 137/512.1 |
| 3,696,832 | 10/1972 | Maurice et al. | 137/512.1 |
| 4,005,732 | 2/1977 | Buckner | 137/512.1 |
| 4,043,358 | 8/1977 | Sliski | 137/512.1 |
| 4,257,451 | 3/1981 | Paton | 137/512.1 |
| 4,457,333 | 7/1984 | Sharp | 137/512.1 X |
| 4,585,026 | 4/1986 | Norton | 137/512.1 |
| 4,694,853 | 9/1987 | Goodwin | 137/512.1 |

FOREIGN PATENT DOCUMENTS

| 3240148 | 5/1984 | Fed. Rep. of Germany | 137/512.1 |
| 0171170 | 10/1982 | Japan | 137/512.1 |
| 2096281 | 10/1982 | United Kingdom | 137/512.1 |

Primary Examiner—John Rivell
Attorney, Agent, or Firm—Thad G. Long

[57] ABSTRACT

A check valve having a plate comprising a sheet material body with at least one hinge lug for mounting the plate on a hinge and a valve face for engaging, in use, a valve seat of the valve.

9 Claims, 5 Drawing Sheets

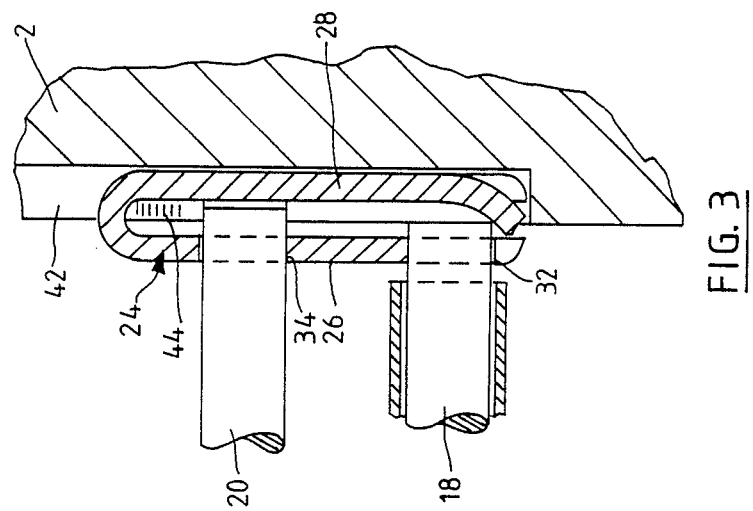

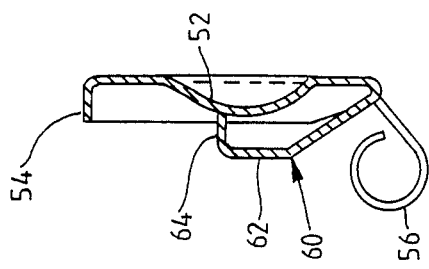
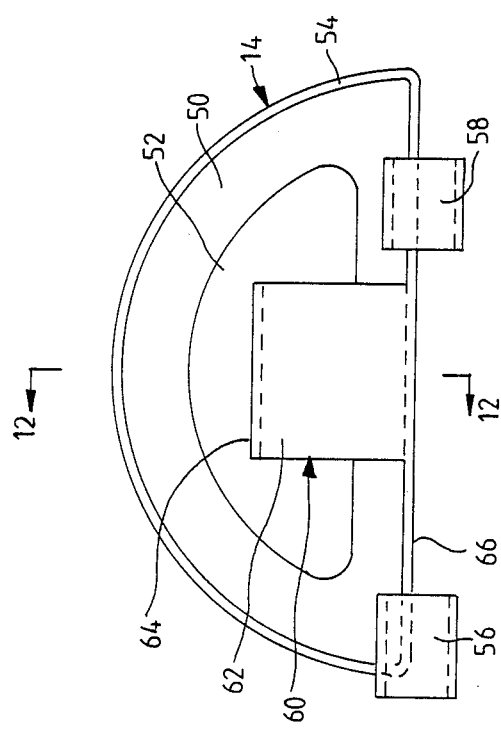
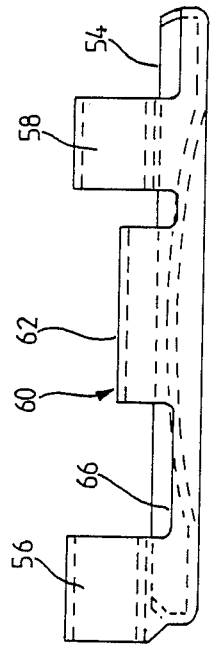

CHECK VALVE

This invention relates to check valves. This application is based upon Australian Patent Application Nos. PJ 0561/88 and PJ 05060/88 and clams priority afforded it by the Paris Convention.

In a known form of check valve, the valve comprises body having a bore therethrough. A pair of semi-circular valve plates are mounted on a hinge pin which extends across the bore. In the closed position of the valve, the plates are generally coplanar and transverse to the bore through the body. In this position the peripheries of the plates engage a valve seat to form a seal. In the open position, the plates rotate away from the valve seat and a stop pin is normally being provided to limit the extent of rotation of the plates.

Normally the plates are cast in stainless steel or bronze and need to be machined prior to assembly. It will be appreciated that the known plates are relatively heavy and are laborious to produce. These factors increase the costs of production of the plates.

An object of the present invention is to provide a novel form of plate which substantially reduces these problems.

According to one aspect of the present invention there is provided a plate for a check valve, said plate comprising a body which has at least one hinge lug for mounting the plate on a hinge and a valve face for engaging, in use, a valve seat of the valve, characterized in that the body is formed from sheet material.

Preferably, the plate is also formed with a stop formation which, in use, comes into engagement with a stop pin for limiting rotation of the plate.

It is further preferred that the plate is formed by deformation of stainless steel sheet.

Normally the plates are semi-circular and can be made in a range of diameters from 40 to 2500 mm. It is further preferred that the thickness of the stainless steel sheet material is at least 1.5 mm.

The invention also provides a check valve which includes the valve plates defined above.

In known forms of check valves, a valve body has a central bore across which a hinge pin is mounted. A pair of valve plates are hingedly connected to the hinge pin. In the closed position, the plates are generally co-planar and extend transversely across the bore. A stop pin is also connected across the bore and served to limit rotational movement of the plates when in their open position.

The known arrangement has a number of disadvantages.

A first disadvantage is the labour cost involved in mounting of the ends of the pins in the valve body. The valve body must be drilled and tapped so that plugs can be inserted to hold the ends of the pins in place. Also pin stabilizers are sometimes fitted between the ends of the pins and the plugs. These manufacturing steps are quite laborious and therefore contribute significantly to the cost of the valve.

Another problem with the known arrangement is that turbulence in the fluid flowing through the valve bore can cause rotation of the pins. This increases the rate of wear and corrosion of the valve body adjacent to the pins, especially where the valve bodies are made from cast iron. Failures can occur because of hole enlargement owing to this rotation.

A further object of the present invention is to provide a clip for supporting the ends of the pins, the provision of the clip at least partially overcoming the problems noted above.

According to a second aspect of the invention there is provided a clip for use in a check valve, said clip including first and second recess for receipt, in use, of hinge and stop pins and resilient projections for resiliently engaging and interlocking with the valve body.

Preferably, the clip is shaped so that it will keep the ends of the shaft away from the valve body so that rotation of the pins will not cause corrosion of the valve body. Further, the resilient projections enable the pins and clips to be snap fit in recesses formed in the valve body. This is a much simpler and less expensive technique of assembly.

According to another aspect of the invention there is provided a clip for use in a check valve, said clip including a body having first and second recesses for receipt, in use, of hinge and stop pins, said body including portions adjacent to the recesses for engaging, in use, the ends of pins and thereby preventing the ends of the pins contacting the valve body.

The invention also provides a check valve comprising a valve body, a hinge pin, valve plates mounted on the hinge pin, a pair of pin support members carried by the valve body, said support members preventing contact of the ends of the pin with the valve body.

According to another aspect of the invention there is provided a method of making a check valve, said method comprising the steps of forming a pair of diametrically opposed recesses in a valve body, locating pin support clips on respective ends of a pin to form a clip-pin assembly, said clips including resilient projections, and mounting the clip-pin assembly in the valve body such that the resilient projections of the clips engage respective recesses in the valve body.

BRIEF DESCRIPTION OF THE DRAWINGS

The invention will now be further described with reference to the accompanying drawings, in which:

FIG. 3 is a fragmentary sectional view along the line 3—3;

FIG. 10 is a side view of a valve plate of the invention;

FIG. 11 is an edge view of the valve plate; and

FIG. 12 is a sectional view along the line 12—12.

DETAILED DESCRIPTION OF THE DRAWINGS

Figure 1:
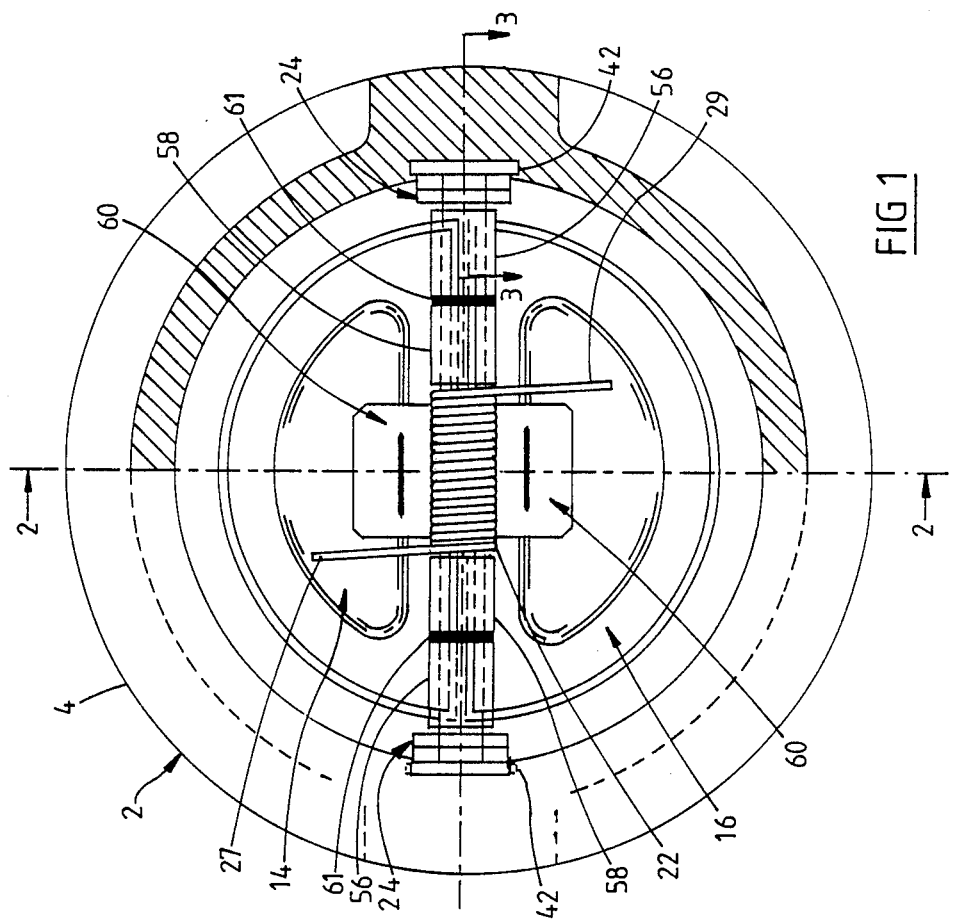
FIG. 1 is an axial view, partly in section, of a check valve of the invention.
Figure 2:
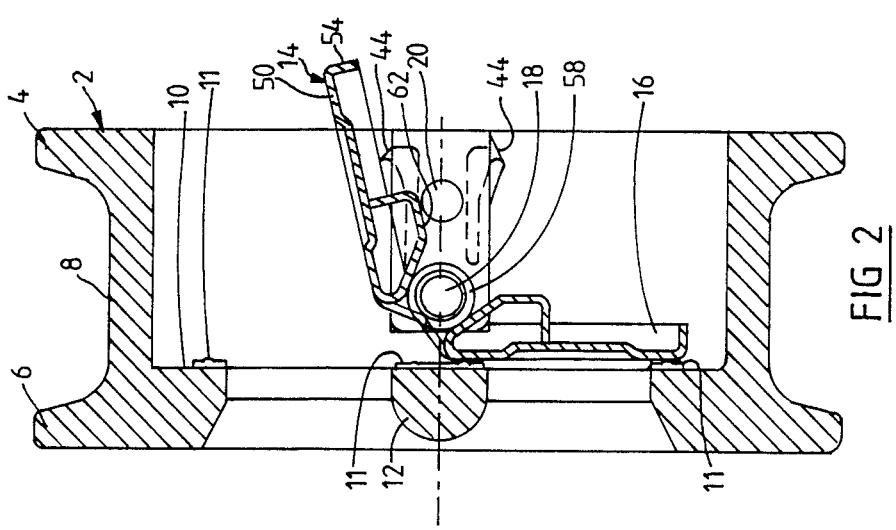
FIG. 2 is a cross-sectional view along the line 2—2.

The valve diagrammatically shown in FIGS. 1 and 2 comprises a valve body 2 having a generally hollow cylindrical shape. The body has end flanges 4 and 6, sidewall 8, valve seat 10 and centre rib 11. The end flanges could be omitted and a diametrical rib provided on the body. The valve has first and second generally semi-circular plates 14 and 16 pivotally connected on a hinge pin 18 which extends generally parallel to the rib 11. The valve includes a stop pin 20 which extends across the valve body parallel to the hinge pin 18. The stop pin 20 serves to limit the degree of opening of the valve plates 14 and 16, as illustrated the top half of FIG. 1 which shows the plate 14 in its fully opened position. The valve includes a spring 22 having end legs 27 and 29 which bias the plates 14 and 16 into sealing contact with the valve seat 10 and the rib 11 (the spring is omitted in FIG. 2 for clarity of illustration). Elastomeric seals 11 are provided on the seat 10.

Figure 6:
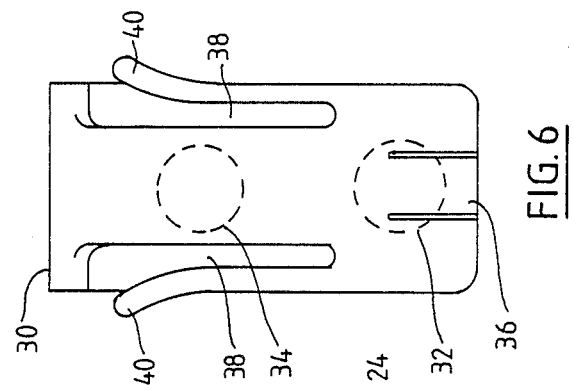
FIG. 6 is an opposite side view of the clip.
Figure 5:
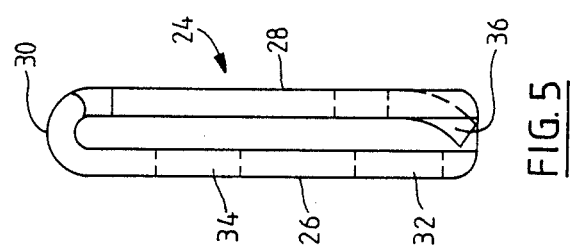
FIG. 5 is an edge view of the clip.
Figure 4:
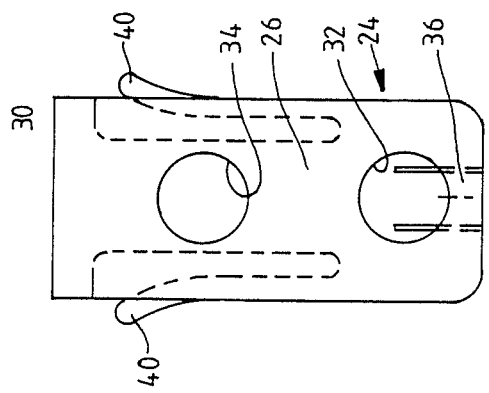
FIG. 4 is a side view of a clip of the valve.

The pins 18 and 20 are carried by a pair of clips 24 which are illustrated in FIGS. 4, 5 and 6. The clips 24 are preferably formed from sheet stainless steel such as 420 or duplex and subsequently hardened or worked and tempered, if necessary, to have the resilience of a spring. As best seen in FIG. 5, the clip has a front face 26 and rear face 28 connected by a curved portion 30. The front face 26 includes a lower bore 32 and an upper bore 34. The rear face 28 has a central interned tab 36 which engages the front face 26 and serves to maintain the gap between the faces 26 and 28. The rear face 28 includes a pair of slots 38 extending generally longitudinally and defining outwardly projecting resilient fingers 40.

As best seen from FIGS. 1 and 3, the clips 24 received within recesses 42 formed on opposite sides of the valve body. The recesses 41 have a width which generally corresponds to the width of the clips 24. However, as seen in FIG. 2, the recesses include rebates 44 which receive the resilient fingers 40 and thus hold the clips 24 in place. The depth of the recesses 42 is such that the front faces 26 of the clips are located within the bore of the valve, as seen in FIG. 1.

Figure 9:
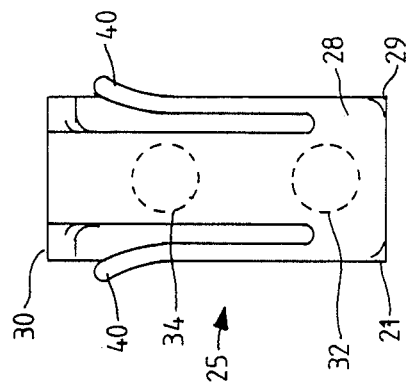
FIG. 9 is an opposite side view of the other clip.
Figure 8:
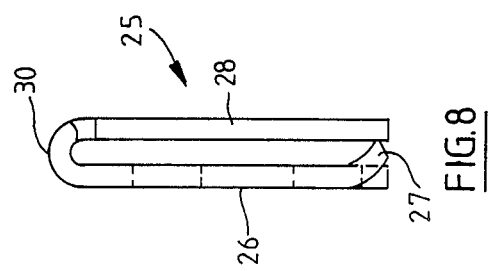
FIG. 8 is an edge view of the other clip.
Figure 7:
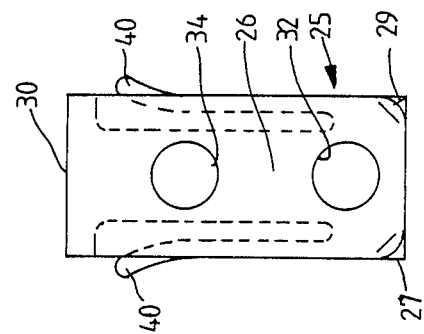
FIG. 7 is a side view of another clip of the invention.

The clip 25 illustrated in FIGS. 7, 8 and 9 is generally similar to that shown in FIGS. 4, 5 and 6 and functions in the same way. In this arrangement however the tab 36 is omitted but the lower corners 27 and 29 of the face 26 are deflected inwardly to touch the adjacent face 28 and thereby maintain the gap therebetween.

The valve is assembled by first forming a sub-assembly which comprises the pins 20 and 22 with the plates 14 and 16 and spring 22 mounted thereon. The sub-assembly includes the clips located on the ends of the pins. The sub-assembly is then pressed into the bore of the valve so that the clips 24 enter the recesses 42 and when the clips 24 are fully seated within the recesses, the resilient fingers 40 will engage the rebates 44 to hold the sub-assembly firmly in place in the valve body. In this position, the valve plates 14 and 16 engage the seals 11 bonded to the valve seat 10.

The valve can be made in various sizes say from 40 to 2500 mm and the clips can be made in corresponding sizes.

FIGS. 10, 11 and 12 illustrate in more detail the novel shape of the valve plates 14 and 16. The plates are identical and therefore only one need be described. The plate 14 is formed from pressed stainless steel sheet material such as SAF 304 stainless steel. It has a generally semi-circular face 50 formed with a central domed depression 52 for stiffening the plate, the front face forming a flat surface which forms a seal against the elastomeric seal 11. The curved edge of the plate is formed with a rearwardly directed strengthening flange 54. The transverse edge of the plate is formed with hinge lugs 56 and 58 which in use permit the plate to be mounted on the hinge pin 18. At the centre of the transverse edge is an abutment formation 60 which includes a leg 62 which is generally parallel to the face 50 of the plate and an interned leg 64 which abuts the recess 52 and therefore assists in keeping the required shape of the abutment projection. The transverse edge includes flanges 66 extending between the lugs 56 and 58 and the formation 60 for strengthening purposes.

FIGS. 1 and 2 show the plates 14 and 16 mounted on the hinge pin 18. The configuration is such that the faces 50 of the plates engage the seals 11 when the mounting clips 24 are correctly seated in the recesses 42. The spacing and lengths of the lugs 56 and 58 and formations 60 is chosen to extend substantially the full length of the pin 18 so as to avoid unwanted axial movement of the plates along the pin. Washers 61 can be provided between adjacent pairs of lugs, as seen in FIG. 1. When the valve is opened, the plates 14 and 16 rotate inwardly, inward rotation being stopped on engagement of the abutment face 62 on the stop pin 20.

The plates formed as described above are very much cheaper to produce than known plates which are normally cast and then machined. In addition to being much cheaper to produce, the plates have less weight and should improve the efficiency of the valve by lowering pressure losses and reduce closing time.

Many modifications will be apparent to those skilled in the art without departing from the spirit and scope of the invention.

What is claimed is:

1. A clip for use in a check valve having a valve body, said clip including first and second recess for receipt, in use, of hinge and stop pins having respective axes and integral resilient projections for resiliently engaging and interlocking with the valve body, said projections being resiliently deflectable in a plane transverse to said axes.

2. A clip for use in a check valve having a valve body, said clip including a body having first and second recesses for receipt, in use, of hinge and stop pins, said body including portions adjacent to the recesses for engaging, in use, the ends of pins and thereby preventing the ends of the pins contacting the valve body and wherein said body has a plate like front face, a plate like rear face and a connecting portion interconnecting said faces, the faces being spaced and parallel, said first and second recesses being located in said front face and wherein said portions adjacent to the recesses comprise said rear face.

3. A clip as claimed in claim 2 wherein resilient fingers project laterally from the rear face in the plane thereof.

4. A check valve comprising:
a valve body having valve seats therein;
a hinge pin extending across said body; and
a pair of plates having hinge lugs and valve faces, the hinge lugs being rotatably mounted on said hinge pin to enable rotation of said plates from closed positions in which the valve faces engage respective valve seats to open positions in which the valve faces are spaced from the respective valve seats said valve body including recesses for resiliently receiving respective clips, the clips including recesses for supporting of the ends of the hinge pin and means preventing contact of the end of the hinge pin with the valve body, said means being integral with the clip.

5. A check valve as claimed in claim 4 wherein the valve includes a stop pin which is, in use, engaged by the plates in their open positions and wherein the clips include recesses for supporting the ends of the stop pin and means for preventing contact of the end of the stop pin with the valve body.

6. A plate for a check valve, comprising:
(i) a generally semi-circular body;
(ii) a valve face formed on one side of the body for engaging, in use, a valve seat of the valve;
(iii) at least one hinge lug for mounting the plate on a hinge pin;
(iv) a peripheral flange extending from said body on the opposite side to said valve seat characterized in that the body, lug and flange are intergrally plastically deformed from sheet metal, wherein the plate includes a stop formation which, in use, comes into engagement with a stop pin for limiting rotation of the plate and wherein the stop formation extends from the plate on the same side as said flange, and is located adjacent to the centre of the straight side of the semi-circular plate.

7. A plate as claimed in claim 6 wherein there are two of said hinge lugs, one located adjacent one end of the straight side of the semi-circular plate and the other being located on said straight side intermediate of the stop formation and the other end of said straight side.

8. A plate as described in claim 6 wherein the sheet metal comprises stainless steel, the thickness of which is at least 1.5 mm.

9. A method of making a check valve, said method comprising the steps of forming a pair of diametrically opposed recesses in a valve body, locating pin support clips on respective ends of a pin to form a clip-pin assembly, said clips including integral resilient projections, and mounting the clip-pin assembly in the valve body such that the resilient projections of the clips resiliently engage and interlock with respective recesses in the valve body to hold the clip-pin assembly in the valve body, wherein the pin has an axis and the mounting of the clip-pin assembly is effected by movement of the clip-pin assembly in a direction perpendicular to said axis and towards the valve body and wherein the resilient projections are resiliently deflected in planes transverse to said axis on engagement with the recesses.

* * * * *